Figure 1:
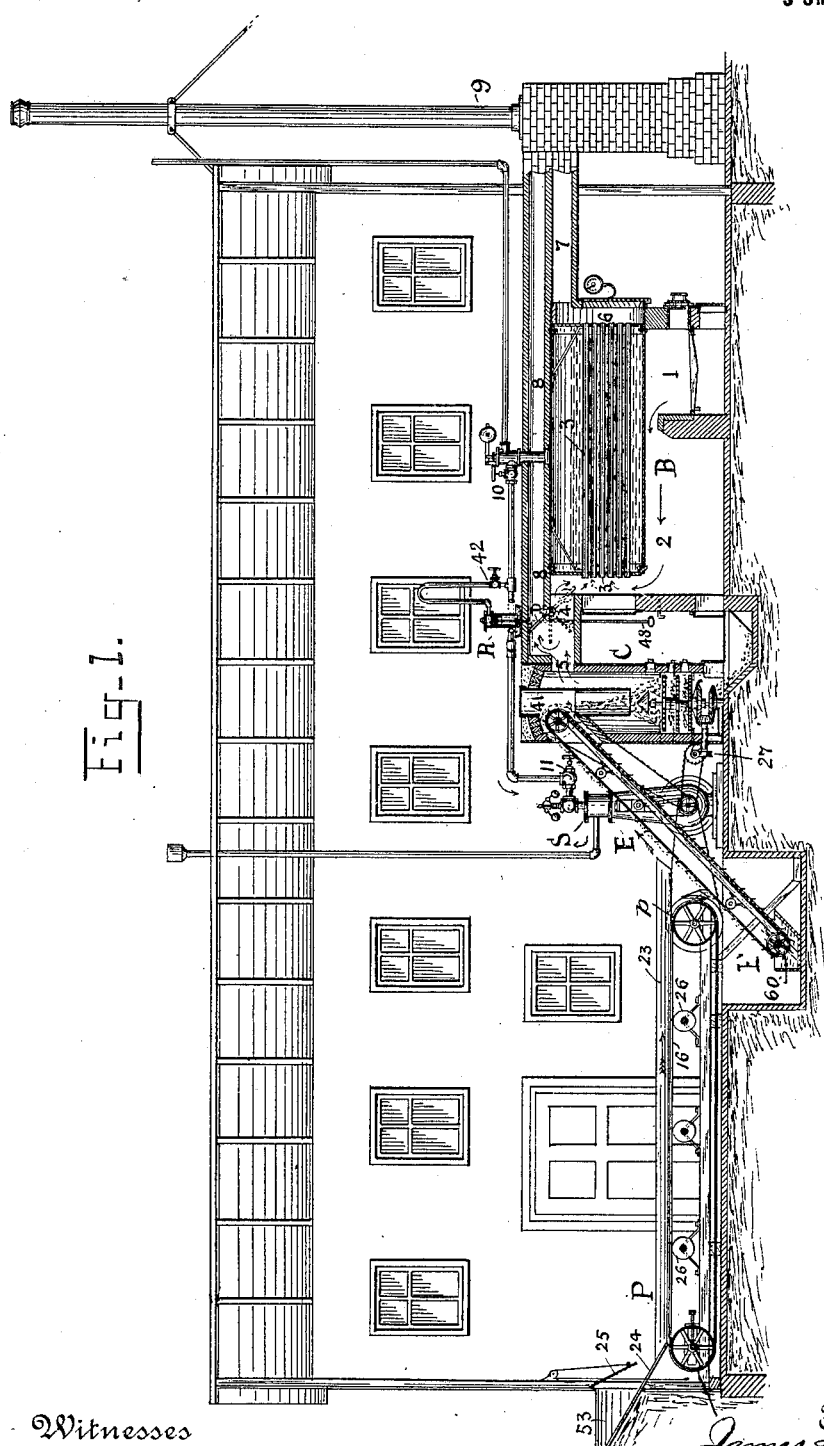

No. 668,947. Patented Feb. 26, 1901.
J. L. BELL & Z. T. SUBERS.
UTILIZATION OF WASTE MATERIALS.
(Application filed Nov. 4, 1898.)

(No Model.) 3 Sheets—Sheet 1.

Witnesses
Charles Hanimann
Harry Miller

Inventors
James L. Bell and
Zachary T. Subers
By their Attorney
H. Mase Peters

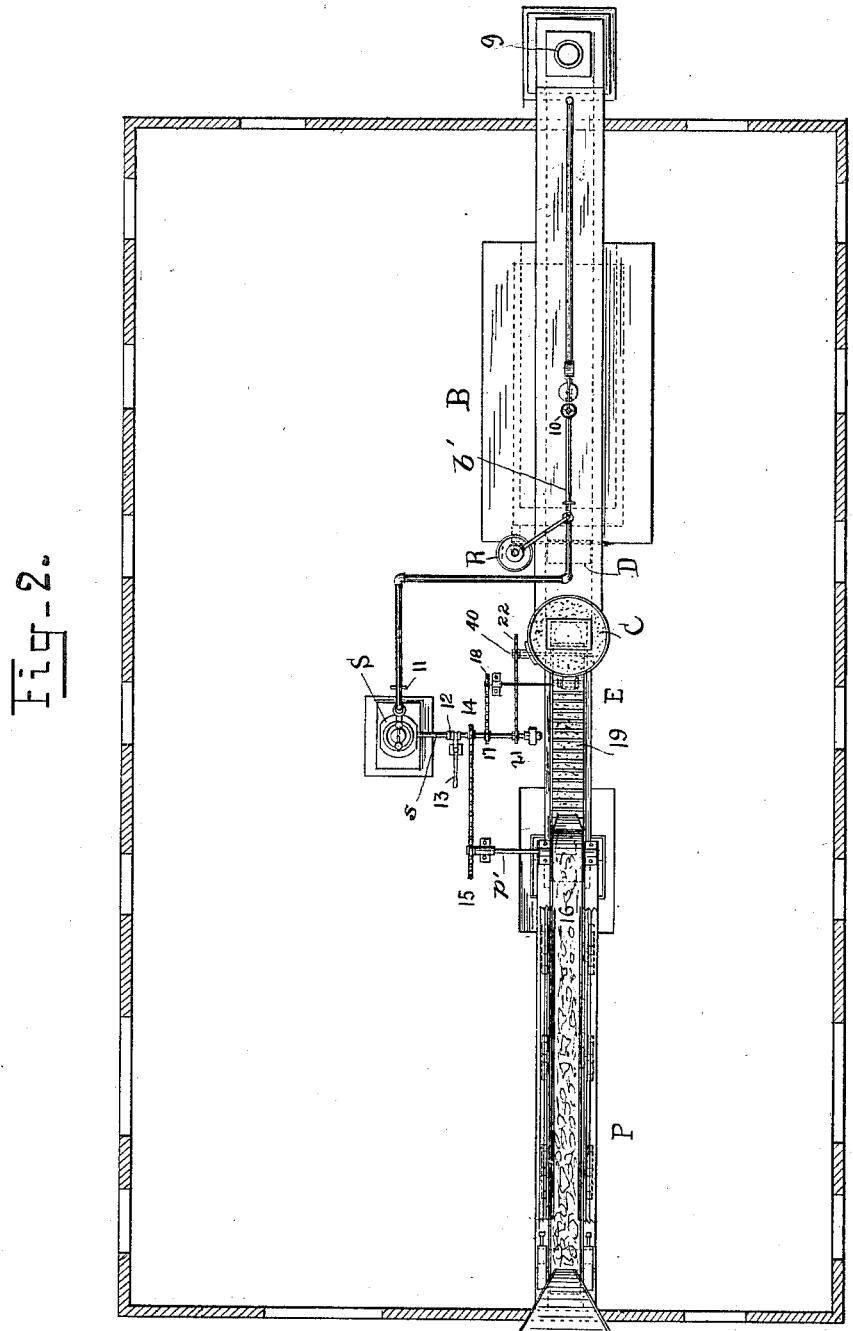

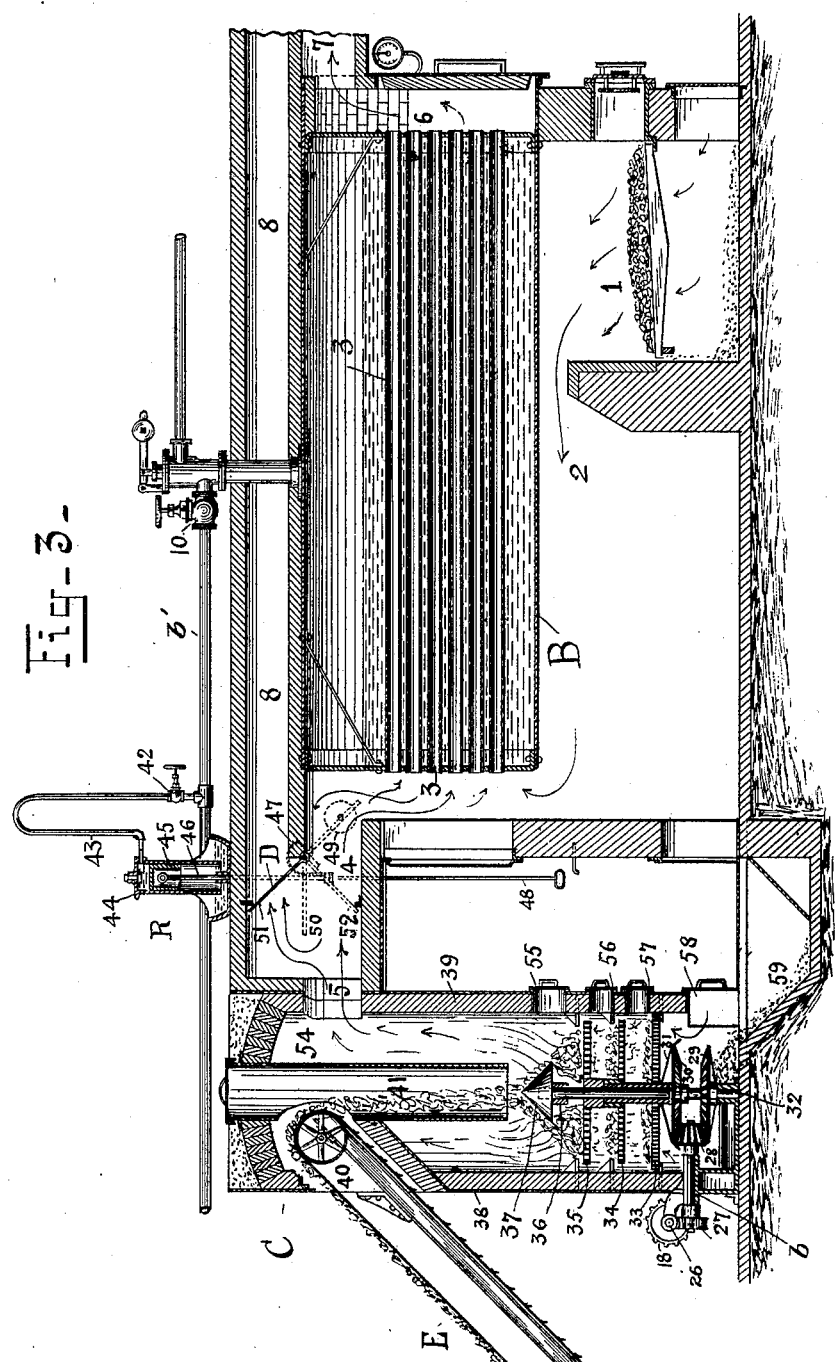

UNITED STATES PATENT OFFICE.

JAMES L. BELL, OF NEW YORK, N. Y., AND ZACHARY T. SUBERS, OF PHILADELPHIA, PENNSYLVANIA.

UTILIZATION OF WASTE MATERIALS.

SPECIFICATION forming part of Letters Patent No. 668,947, dated February 26, 1901.

Application filed November 4, 1898. Serial No. 695,461. (No model.)

*To all whom it may concern:*

Be it known that we, JAMES L. BELL, of the city of New York, State of New York, and ZACHARY T. SUBERS, of the city of Philadelphia, State of Pennsylvania, citizens of the United States, have invented certain new and useful Improvements in Mechanism for Utilizing Waste Material, of which the following is a full, clear, and exact description, reference being had to the accompanying drawings, forming part of this specification.

This invention relates to certain improvements in machines for utilizing waste material; and the principal object of our invention is to provide a machine arranged for the distribution, assortment, and burning of waste or refuse matter, such as may be collected from the houses in cities, whereby the material of any value—such as waste paper, rags, scraps of metal, leather, &c.—may be assorted from the valueless matter and utilized, while the remaining or useless combustible matter is conveyed to a furnace or recess and cremated, the heat arising from such cremation being utilized for generating steam for operating the machine and for furnishing power for other purposes.

A further object of our invention is to provide mechanism for distributing this waste material and for conveying the combustible and useless matter automatically to the retort and also for providing an improved construction of retort or furnace.

A further object of our invention is to provide the apparatus with a boiler for generating steam for the purpose of running the mechanism and for providing means whereby the heat arising from the furnace may be utilized to heat the boiler, so that after the machine is once set in operation it will act entirely automatically without the use of further fuel.

A still further object of our invention is to provide an automatic damper-regulator which will regulate the speed of the driving mechanism and also regulate the boiler pressure.

With these and other objects in view our invention consists in the combination and arrangement of the different mechanisms, such as will be hereinafter fully described, and particularly pointed out in the claims.

Referring to the drawings, which form a part of this specification, and in which similar characters of reference are used to indicate similar parts, Figure 1 is a side elevation, partly in section, illustrating the entire apparatus. Fig. 2 is a plan view of the mechanism shown in Fig. 1. Fig. 3 is an enlarged elevation in section of the retort or furnace and the boiler mechanism and connecting-flues.

In carrying out our invention we provide an endless table P, carried by a pair of pulleys *p*, provided with a suitable supporting-frame and having suitable supporting-rollers 26, located under the said belt P at intervals, the said pulleys being supported by brackets secured to a supporting-frame on each side of the pulleys. At the forward end of the endless table or carrier P is arranged a chute 53, having an inclined bottom 24, extending to the endless table P for guiding the material on the said table. A gate 25 is provided in the chute and has attached thereto a rope which runs over a pulley secured to the framework, whereby said gate 25 may be raised or lowered for regulating the amount of material to be fed upon the table. Side guards 23 are provided on each side of the endless carrier P for preventing the material being fed from falling off the sides.

E designates an endless elevator-belt which is located at the discharge end of the endless carrier P, the said elevator E being arranged in an inclined position, as illustrated. The upper end of the said elevator-belt E passes over a pulley located in the upper end of a furnace or retort C, while the lower end of the said belt passes over a pulley 60, journaled in a trough filled with water located in a pit F, formed in the foundation of the machine. Thus as the waste material is fed through the chute 53 onto the endless carrier P and discharged at the other end thereof the elevator E will receive such material as is left on the carrier and carry it up into the furnace C.

The upper end of the furnace C is provided with a charging-tube 41, into which the material is delivered from the elevator E. Located directly below the lower end of the charging-tube 41 is a spreading-cone 37, carried by a vertical shaft 32, journaled in suitable bearings provided in the base of the furnace. On the lower end of the shaft 32 are journaled two bevel-gears 29 30, beveled in opposite directions, adapted to engage with a small bevel-gear 28, carried by a transversely-disposed shaft $b$, which is supported in suitable bearings provided in the side wall of the furnace C. On the outer end of this shaft $b$ is a worm-wheel 27, adapted to be engaged by a worm carried by a shaft 26, arranged transversely to the shaft $b$. The other end of the shaft 26 carries a sprocket-wheel 18, which is geared to a smaller gear 17 by means of a suitable chain, the said gear 17 being mounted on the driving-shaft $s$ of an engine S, which will be hereinafter described. On the driving-shaft $s$ is a sprocket 21, which is connected by a chain to a sprocket 22, provided on the end of the shaft 40, which carries the upper pulley of the elevator-belt E. This sprocket-and-chain connection transmits motion from the power-shaft $s$ to the shaft 40 for running the elevator E. A sprocket-wheel 14 is provided on the shaft $s$, which is connected by a chain with a larger sprocket-wheel 15, carried on the shaft $p'$ of the pulley $p$ for transmitting motion to the endless carrier P.

The vertical shaft 32, which carries the spreading-cone 37, is revolved in one direction by means of the gearing heretofore described. Located on the upper part of the shaft 32 is a grate 35, rigidly secured to said shaft and adapted to revolve with it. A short distance below the grate 35 is a second grate 34, having its bars closer together than the grate 35 and mounted on a sleeve carried by the gear-wheel 30, so that it will revolve in an opposite direction to that of grate 35. A third grate 33, supported by lugs or projections formed on the side walls of the furnace, is located below the grate 34, the bars of which are finer and closer together than either of the other grates. Doors 55, 56, 57, and 58 are provided in the side wall of the furnace for access to the different grates and to the ash-pit 59 in the bottom of the furnace. A shield 31 is provided over the top of the gear 30 for protecting it from the fire and ashes.

The upper part of the combustion-chamber 54 of the furnace C is provided with a duct 5, opening into a chamber, which connects with the flues 4 and 8. An automatic damper D, mounted on a shaft 47, supported in the partition-wall of the flues 4 and 8, is provided for opening and closing these flues. A rod 48, secured at its upper end to the damper D, having a ring or loop on its lower end adapted to engage a hook secured in the furnace-wall, is provided for holding the damper in a horizontal position, as illustrated in dotted lines at 50 in the drawings. This would be the position the damper would assume in starting the apparatus, so as to obtain a draft from the fire-box 1 through the passages 2, 3, and 4 to the flue 8 and to the chimney 9. On the outer ends of the shaft 47, upon which the damper B swings, are provided weights 49, adapted to throw the damper D in the position shown at 51 when the rod 48 is released from its supporting-hook.

B designates a horizontal boiler of the ordinary construction having a series of flues 3 located therein and supported by suitable brickwork, as illustrated in Figs. 1 and 3 of the drawings. Located under the rear end of the boiler B is a fire-box 1, provided with a feed-door, as shown. This fire-box is used only when first starting the apparatus, as after steam is generated and the machine is set in operation the combustible matter fed from the carrier P and elevator E affords sufficient fuel to feed the furnace C and furnish the necessary amount of heat in the boiler B without the use of the fire-box 1.

The boiler B is provided with pipes $b'$, which run to and operate a steam-engine S, which transmits power to the driving-shaft $s$ for running the machine, as heretofore described. This engine S may be of any desired construction.

In order to provide means for regulating the running speed of the apparatus and also the boiler-pressure, we provide an automatic damper-regulator R, which is located on one side of the machine, near the damper-shaft 47. This regulator consists of a cylinder 44, open at its lower end and having provided therein a piston 45, carrying a piston-rod 46, the lower end of which is connected to a crank secured to the damper-shaft 47. A steam-pipe 43 connects the upper end of the cylinder 44 with the pipe $b'$. Thus when the steam in the boiler exceeds a normal pressure the same will cause the piston 45 to descend and close the damper D or throw it down in the position illustrated in dotted lines at 52 of the drawings, thereby closing the flue 4 and preventing the heat from passing into the boiler-flues 3 and directing it into the flue 8, from whence it passes into the chimney 9. As soon as the pressure becomes sufficiently lowered the damper is again raised through the action of the balance-weights 49, overcoming the steam-pressure acting on the piston 45, thus allowing the damper D to again resume the position illustrated at Fig. 1 in the drawings.

In operation the first step is to start a fire in the fire-box 1, having the damper in a horizontal position and the flues 4 and 8 both open, so as to produce the necessary draft, and thus heating the boiler and generating enough steam to start the engine S in operation, which, through its driving-shaft $s$ and connecting-gearing, heretofore described, transmits motion to the endless carrier E and feeds what material is left on the said carrier to the elevator E, which is also operated by the driving-shaft of the engine and which feeds the said combustible and waste material to the furnace C. The spreading-cone 37 distributes the material upon the rotating grate 35, where it is ignited, the lower grates serving to catch the smaller particles which might drop through the upper grates, so as to insure the complete burning and reduction to ashes of all the material fed into the furnace, the said ashes dropping down into the ash-pit 59. The heat thus arising passes through the flues 5 and 4 into the boiler-flues 3 and out through the passages 6 and 7 to the chimney 9, this heat being all that is necessary to run the boiler, so that after starting the fire in the box 1 may be dispensed with altogether.

The carrying-table P is of considerable length and must run rather slowly, as at this point it is intended to employ a number of hands for picking out the different materials which are fed upon the said table and which could be utilized—such as paper, rags, scraps of metal, leather, &c.—which can all be utilized or sold, the remaining material and waste being all carried to the furnace and utilized as fuel for generating steam in the boiler for running the machine and also for furnishing power for other purposes, if it should be desired.

Various changes and modifications might be made in our construction without departing from the spirit and scope of our invention. Hence we do not desire to limit ourselves to the exact construction shown.

Having described our invention, what we claim, and desire to secure by Letters Patent, is—

1. The combination of a retort or furnace, means for automatically feeding the refuse material to the same, a spreading device for evenly distributing the refuse on the grates, means for rotating the spreading device, a series of grates of varying coarseness, arranged one below the other, and means for revolving said grates, substantially as described.

2. In a retort or furnace, the combination of an endless belt for feeding refuse material to the fire-chamber, a spreading-cone centrally located in the fire-chamber below the refuse-inlet, means for revolving the said cone, a series of grates having openings of varying widths arranged one below the other located below the spreading-cone, and means for revolving the adjacent grates in opposite directions, substantially as described.

3. The combination of a retort or furnace, a charging-tube located in the upper portion of said retort, an endless carrier for feeding the refuse material to said charging-tube, a revolving cone located directly below the end of the charging-tube for spreading the refuse as it is discharged, a series of revolving grates of varying coarseness arranged in succession below the spreading-cone, and a series of gears for revolving the adjacent grates in opposite directions, substantially as described.

4. The combination of a retort or furnace of an endless table, P, located adjacent to the said furnace for receiving the refuse material, an inclined endless elevator-belt arranged at the end of said table, a charging-tube 41, located in the upper portion of the furnace having a side opening into which the upper end of the elevator enters to deliver the material, a revolving spreading-cone, 37, located beneath the lower end of the charging-tube, and a series of revolving grates arranged below said spreading-cone, said grates being of varying coarseness, substantially as described.

5. The combination of a retort or furnace, mechanism for feeding the refuse material to the fire-chamber, a charging-tube extending down into the fire-chamber, a shaft, 32, having a spreading-cone, 37, secured to its upper end, a gear, 29, secured on said shaft adapted to mesh with a gear, 28, carried by a driven shaft, a sleeve loosely mounted on said shaft, 32, a gear, 30, secured to said sleeve, a grate, 34, rigidly secured to said sleeve so as to revolve therewith, and a grate, 35, secured to the shaft, 32, substantially as described.

In witness whereof we have hereunto set our hands and seals this 3d day of November, A. D. 1898.

JAMES L. BELL. [L. S.]
  ZACHARY T. SUBERS. [L. S.]

Witnesses as to the signature of J. L. B.:
 H. J. SUBERS,
 WOODFORD BROOKS.

Witnesses as to the signature of Z. T. S.:
 B. J. WOODWARD,
 FRANK D. GRAHAM.